United States Patent [19]

Wilensky

[11] Patent Number: 4,722,162
[45] Date of Patent: Feb. 2, 1988

[54] ORTHOGONAL STRUCTURES COMPOSED OF MULTIPLE REGULAR TETRAHEDRAL LATTICE CELLS

[75] Inventor: Joseph Wilensky, Denver, Colo.

[73] Assignees: Soma Kurtis; Jack Sloan, both of Denver, Colo.

[21] Appl. No.: 64,860

[22] Filed: Jun. 19, 1987

Related U.S. Application Data

[63] Continuation-in-part of Ser. No. 793,660, Oct. 31, 1985.

[51] Int. Cl.[4] .............................................. E04H 12/00
[52] U.S. Cl. ................................. 52/648; 52/DIG. 10
[58] Field of Search .......................... 52/648, DIG. 10

[56] References Cited

U.S. PATENT DOCUMENTS

| | | | |
|---|---|---|---|
| 4,207,715 | 6/1980 | Kitrick | 52/DIG. 10 |
| 4,446,666 | 5/1984 | Gilman | 52/DIG. 10 |
| 4,482,900 | 11/1984 | Bilek | 343/915 |

OTHER PUBLICATIONS

Space Grid Stuctures by John Borrego, TA660.G7, pp. 19, 78–83, 103 and 104, copy in A.U.
Order in Space, by Critchlow, c 1969, pp. 8, 110, Appendix 2, QA 464.C7, copy in A.U. 354.
Domebook II, c Pacific Domes, 1971, p. 9, copy Art Unite 354.

Primary Examiner—Henry E. Paduazo
Attorney, Agent, or Firm—Dorr, Carson, Sloan & Peterson

[57] ABSTRACT

Regular tetrahedral lattices (RTL's) can be used as building blocks in continuous one, two, and three-dimensional structures of superior lightness, strength, and rigidity. Such lattice structure can be thought of as consisting of at least 3 imaginary, edgeless cubic cells, wherein each cell contains a pair of RTL's and each RTL pair is formed entirely from six right-angle crossing elements of equal arm length and joined at eight vertices. Each of the eight vertices corresponds to a corner of one imaginary cubic cell and each of said cubic cells, together with each of said RTL pairs, shares an interface with at least one other cubic cell and RTL pair of said lattice structure. These structures can be formed into straight-line chains, make ninety-degree turns and three-dimensional right-angle crosses, thereby lending themselves to conventional construction with simple fabrication methods and rapid repairs in place.

3 Claims, 5 Drawing Figures

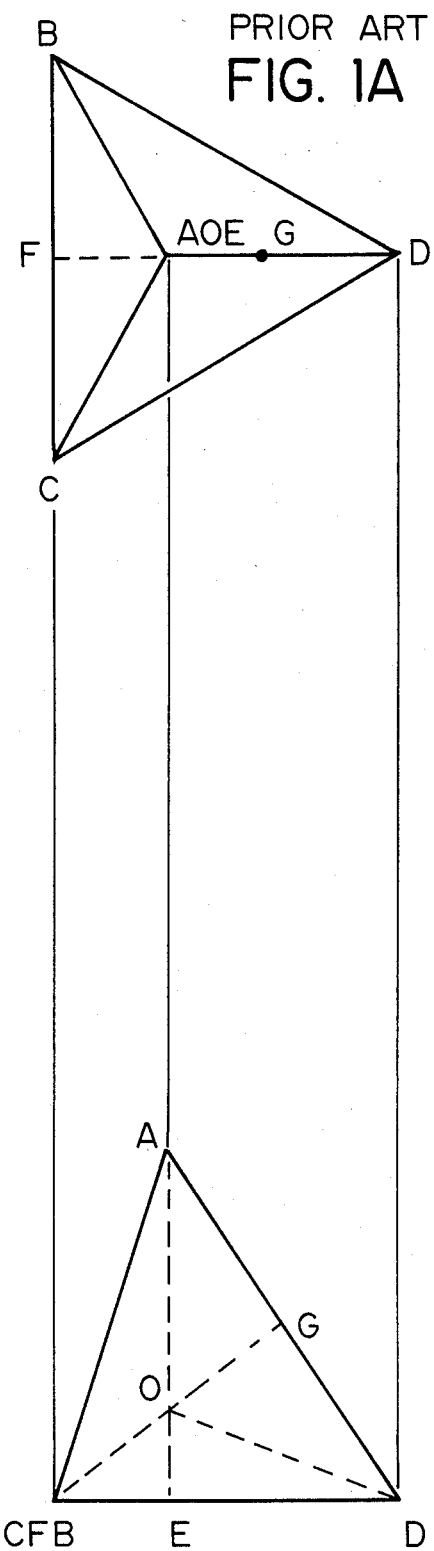
PRIOR ART
FIG. 1A
PRIOR ART
FIG. 1B
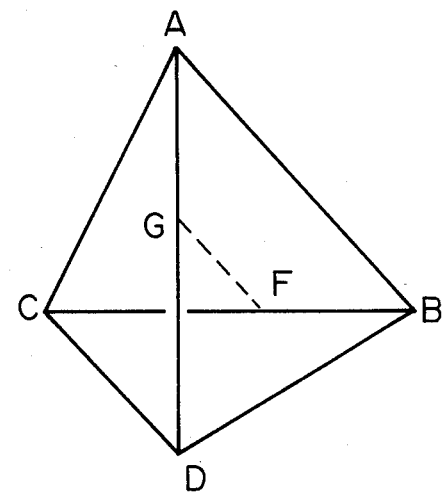
PRIOR ART
FIG. 1D
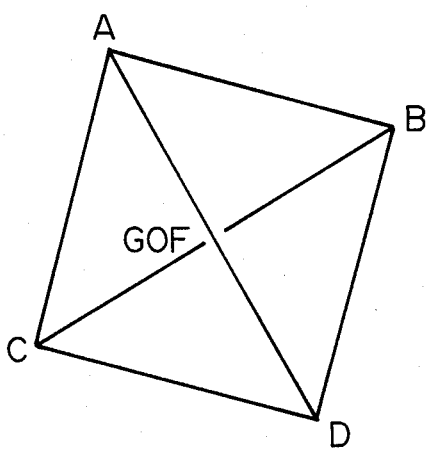
PRIOR ART
FIG. 1C PRIOR ART
FIG. 2A
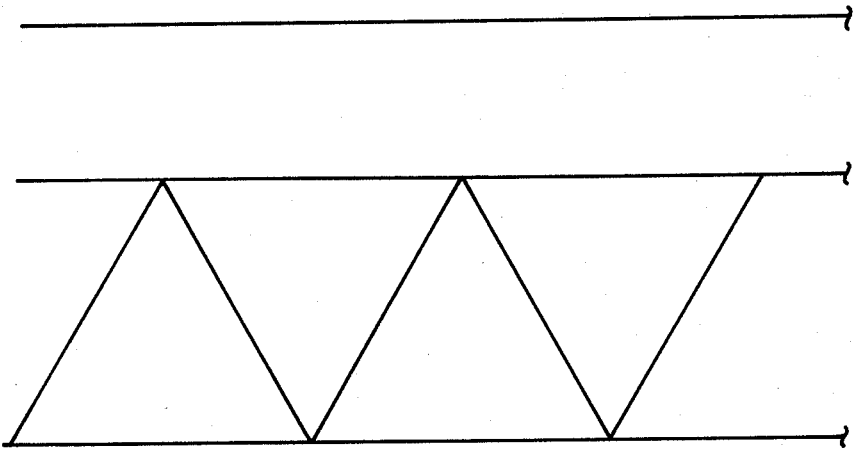
PRIOR ART
FIG. 2B
PRIOR ART
FIG. 2C
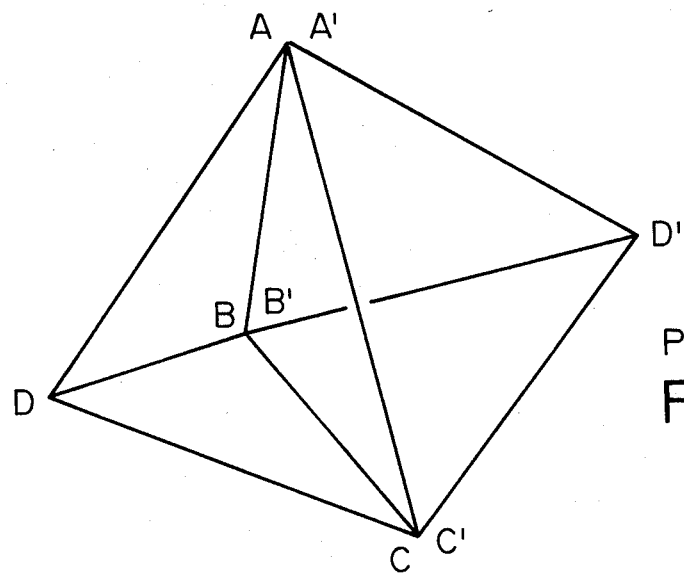
PRIOR ART
FIG. 3

PRIOR ART
FIG. 4A
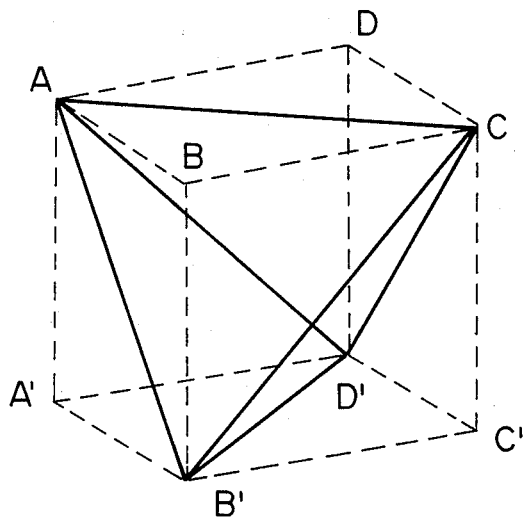
PRIOR ART
FIG. 4C
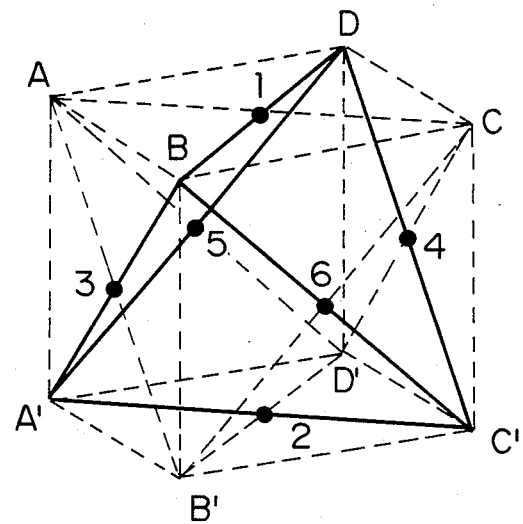
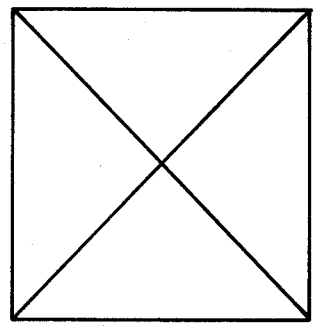
PRIOR ART
FIG. 4B
PRIOR ART
FIG. 4D
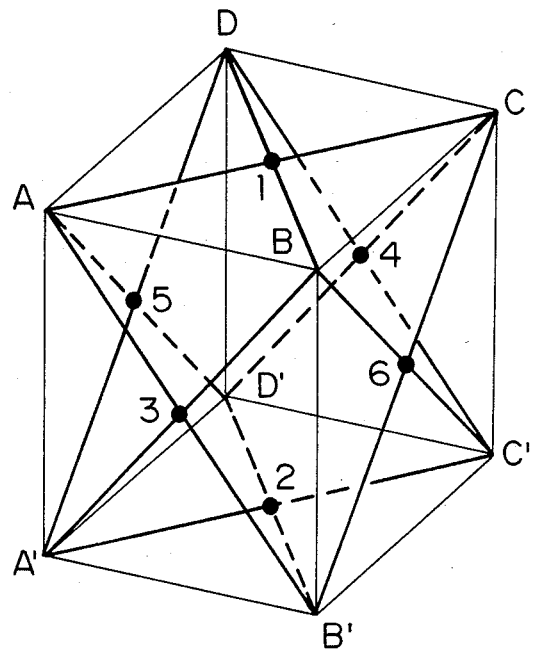

ORTHOGONAL STRUCTURES COMPOSED OF MULTIPLE REGULAR TETRAHEDRAL LATTICE CELLS

This patent application is a continuation-in-part of my copending U.S. patent application Ser. No. 793,660 filed on Oct. 31, 1985.

BACKGROUND OF THE INVENTION

1. Field of the Invention

This invention relates generally to structural forms used in the construction of trusses, columns, towers, spans, continuous planar decking surfaces, internal bracing of hollow spaces, etc. Such structural forms are used as elements of a wide variety of engineering and architectural macrostructures.

2. Description of the Prior Art

Man has long recognized the utility of interconnecting planar triangles to provide strength and rigidity to various structural forms. The common truss is perhaps the best know example of this concept. Trusses are plane structures composed of a series of adjoining triangles which are composed of straight members all lying in one plane. The members may be connected at their points of intersection by pins, gusset plates, welding, etc. The point of intersection is often referred to as a panel point or joint. Since rigidity of such trusses is secured by triangles which cannot be changed in form without changing the length of at least one side, it is generally assumed that loads applied at the panel points will product direct stress only. This would only be true, however, if the gravity axes of the members were to meet at the panel point and if the forces involved were being applied to members connected by means of frictionless pins. Actually, since the joints are rigid, bending stresses due to the deflection of the panel points are also developed. These stresses are commonly called secondary stresses. When a load is applied to a member between the panel points, it must distribute that load by beam action to the adjacent panel points. One of the many objects of this invention is to minimize strains resulting from these secondary stresses. Many other objects will become apparent in later parts of this disclosure.

It is also well-known that the strongest geometric structure known to man as well as found in nature, in terms of strength per weight unit and distribution of stresses, is the combination of six elements of equal length to form the edges of a regular tetrahedron. This is commonly known as a triangular pyramid—a solid having four vertices, six edges, and four equilateral triangular plane faces and in which three edges meet at each vertex. The strength of a lattice of this form is even exhibited at the atomic and molecular levels: diamond, the hardest known substance, exemplifies the tetrahedral crystalline lattice structure. Nature also employs the tetrahedral structure in the formation of the strongest and most stable chemico-physical bonds in molecules, compounds, and crystalline solids of carbon and silicon.

At the atomic and/or molecular levels, the natural formation of lattices of multiple tetrahedra is, without exception, external face-to-face, vertex-to-vertex connection (shown in FIG. 3). Any other connection would be a flaw in the lattice of these materials. The result of such tetrahedral configurations are macrostructures which show exceptional strength under compressive and tensile stresses, but are far weaker when subjected to torsional and flexural stress and buckling strains. It is also well known that man made structures, especially elongated members under compressive stress exhibit excessive strain unless these members are further supported in additional ways. The most common such support is provided by what is commonly called center-span lateral support, for which the overall supportable stress for a given structure increases dramatically.

In view of these observations, the methods and structures of this invention are built upon the permise that the basic strength of the RTL (as shown in FIG. 1) is unquestioned. It is axiomatic that, from a practical standpoint, such strength means support of applied stresses with minimum material in the several different ways that stresses may be applied. That is to say, that a structure may be strong in supporting a stress applied in one direction but weak to loads applied in another manner or direction. Thus, for example, common trusses such as shown in FIG. 2, would exhibit little strength if a bending moment were applied to it perpendicular to the two-dimensional plane of the truss. Similarly, nature's method of connecting tetrahedra, i.e., vertex-to-vertex (as shown in FIG. 3), shows little resistance to torsional stress and cannot be connected in continuous linear fashion, i.e., one-dimensional linear structures, or in planar, two-dimensional structures. Consequently, man-made approximations to such connections, RTL's assembled face-to-face, vertex-to-vertex, would exhibit little flexural, torsional, or buckling strength, nor would such assemblies lend themselves to the orthogonal structures of conventional design.

SUMMARY OF THE INVENTION

There are other, additional ways in which tetrahedra can be connected to great structural advantage. One can be thought of as a reversed face-to-face connection in which adjacent RTL's are connected at four points: two vertex-to-midpoints and two midpoint-to-midpoints. In other words, this connective arrangement results in a macrostructure wherein one vertex of a first RTL is connected to the centerpoint of an element of a neighboring RTL; one vertex of the neighboring RTL is connected to the centerpoint of an element of the first RTL; and the centerpoints of the remaining four elements in contact are connected where they cross.

There is, however, a second alternative to nature's face-to-face connection. It is that of cells containing paired RTL's fitted in such a manner that their two sets of four vertices coincide with the eight vertices of a regular cube. As shown in FIGS. 4,4B,4C and 4D, the resulting structure comprises twelve real elements forming the diagonals of the six faces of the imaginary cube: one element from each of two RTL's for each pair of cube face diagonals,. Thus the structure consists of six equal-arm-length, right-angle (perpendicular) crosses.

The structures of this patent disclosure are to be constructed according to this last, internal, method noted above; and all references to RTL macrostructures will be understood to be connected according to that internal configuration. Similarly, all macrostructures consisting of pairs of internally connected RTL's may be thought of as a system consisting of an assembly of internally connected, paired, RTL's, in imaginary cubes. The "cubes" may in turn be assembled into macrostructures. The macrostructures, in turn, can then be assembled into macro-macrostructures in a linear sense as well as in an orthogonal sense. In any case, such internally connected, paired RTL's in their imaginary cubes then can be thought of, and may be referred to as, a cube structure ("CS") such as the one shown in FIG. 5B.

It will be appreciated that these cubes may then be assembled according to this invention disclosure into structures, from the most simple to the most complex, as simple building blocks providing for macrostructures of at least three such cubes along the three mutually perpendicular, orthogonal axes of space which are, in effect, the mutually perpendicular axes of length, width and height encountered in common construction.

In actual practice, an essential characteristic of such macrostructures will be the sharing of one face of the cube, in effect, one right angle cross, with a consecutive cube as a mutual interface. As seen in FIG. 5A, the elements A,B' and B,A' are shared by cube 1 and cube 2, the elements D,C' and C,D' are shared by cubes 2 and 3, etc.

Thus, the results of this connective arrangement will be a lattice structure consisting of at least 3 imaginary, edgeless cubic cells, wherein each cell contains a RTL pair and each RTL pair can be formed exclusively from six right-angle crosses of equal arm length and joined at eight vertices, each of which vertices corresponds to a corner of one of said cubic cells with each of said cubic cells, together with each of said RTL pairs, sharing an interface with at least one other cubic cell and RTL pair of said lattice structure.

It will also be appreciated that this internal method of connection provides for macrostructures of consecutive internally connected RTL pairs wherein each neighboring pair of RTL pairs shares a single pair of elements as a common cubic interface, thus forming face-to-face, center-to-center, and alternating vertex-to-vertex continuous internal lattice assemblies.

Considering this method of connection of sharing pairs of elements as the common cubic interface for two cubes, any of the five remaining faces of either of the RTL pairs may serve as a shared pair of elements for contiguous RTL pairs by which means this structure can be extended as noted above.

It will be seen that for each internal pair, connection at the centerpoints of the six diagonal pairs provides complete center-span lateral support for load-bearing of any type in any plane. One advantageous application of such structures is to provide internal bracing for hollow structures such as ships hulls, storage tanks, and pressure vessels at a great savings in weight of the vessel itself, and without occupying the contained space with massive structural members or impeding movement within the space. The RTL's may also be employed to construct "Jungle Jim" type structures in space.

Further advantages following from the above methods and apparatus are: (1) the ability to prefabricate right-angle, equal-armed crosses for fabrication into multiple internal pairs and subassemblies; (2) the ability to construct multiple internal RTL pairs by making end connections between six right-angle, equal-armed crosses; and (3) the ability to construct multiple internal RTL pairs by connection of two internal pairs at the ends of four right-angle, equal-armed crosses.

Those skilled in the art also will recognize that these macrostructures can themselves be assembled into macro-macrostructures forming new, laterally supported CS's. These units may, in turn, be treated as super strength-providing elements in further macro external structures.

For all of the structures heretofore discussed not the least of their virtues is that, in general, every member is an element of identical length and connected at identical angles in repeating patterns. This makes for great ease of construction, repair, fabrication, and prefabrication. The simplicity of employing many small modular elements of construction is derived from the stress distribution characteristics of the basic RTL and leads to an "open" structure, not dependent upon single, massive, obstructive members for strength. Considering this, together with normal design factors of safety, these CSs are not easily damaged, can survive damage or rupture of many elements without overall failure of the macrostructure, and can be perfectly repaired in place quickly, with simple tools, requiring only elemental units for replacement parts. Moreover, the elements themselves may have one or more elements of different cross sectional configuration or different material.

While the specific methods of attachment at all connection points remain largely dependent upon the material(s) of construction, e.g., wood, steel, plastics, reinforced concrete, etc., all the structures of this disclosure are conveniently subject to prefabrication of subassemblies. Six crosses can be pre-assembled into a pair, and two pairs may be connected by four crosses to form a set of three RTL pairs. By these means, continuous beams, planar panels, and other macrostructures can be shop prefabricated, greatly facilitating, simplifying, and reducing the required amount of field construction.

DESCRIPTION OF THE DRAWINGS

Certain conventions of notation, nomenclature, and descriptor identification are adopted in this disclosure for convenience and clarity. These are:

1. Solid, abstract shapes will have broken lines only to represent hypothetical loci. Hidden lines may or may not be shown as solid, to be inferred from other projections.

Figure 5A:
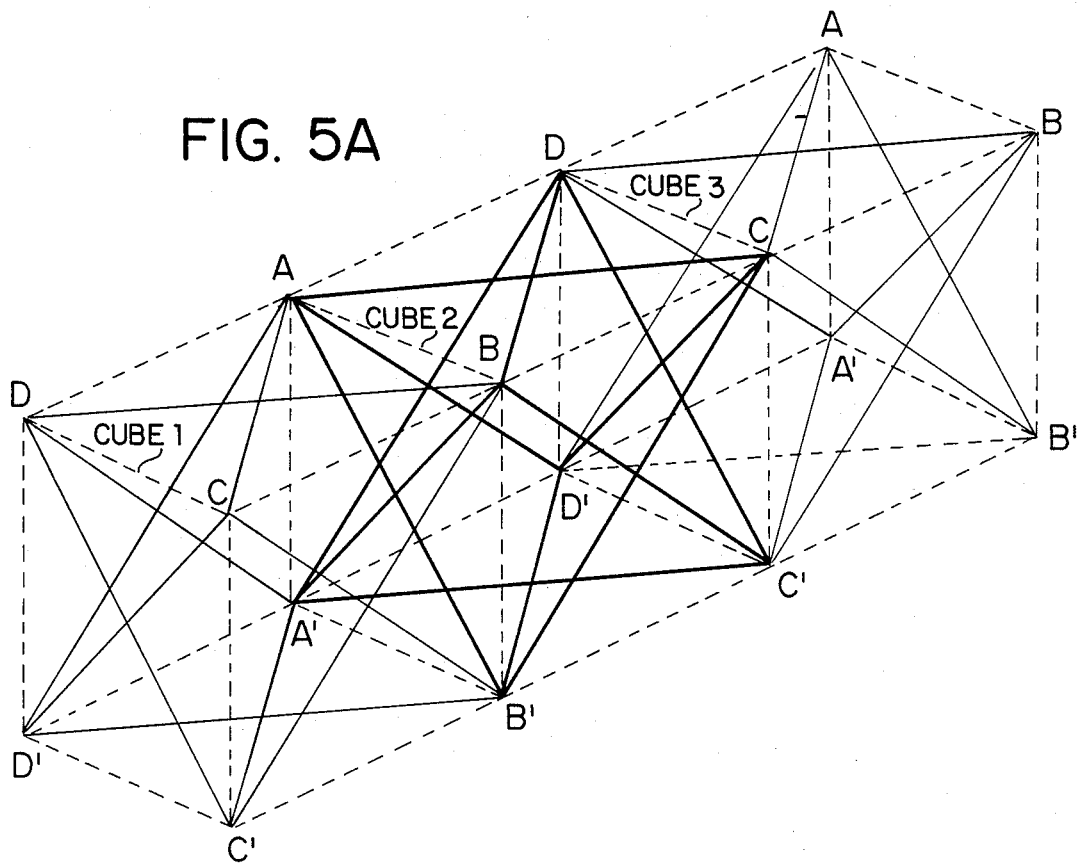

2. Lattices and structures will be represented by the axial centerlines of their elements, regardless of the shape, size, or mass of such elements.

3. Solids and lattices will be continuously lettered proceeding, insofar as possible, in a counter-clockwise direction in the various views.

4. Angles will be designated by the symbol "@" followed by three letters the second of which is at the vertex of the angle, the first and third letters determining the limbs.

5. Where two or more structure and/or lattice elements cross, the crossings are understood to be coplanar by pairs.
That is to say elements do not lap over each other but have a common crossing point at their centerline intersections.

Preferred embodiments of the structures created by the methods of this invention are illustrated in the drawings, wherein, FIG. 1 consists of four views of a regular tetrahedron, ABCD, and/or of a Regular Tetrahedral Lattice (RTL), ABCD. The RTL itself is found in the prior art.

FIG. 2 is a typical conventional truss found in the prior art.

FIG. 3 is an oblique view of two RTL's connected, as in nature, face-to-face, vertex-to-vertex.

FIG. 4A and 4B illustrate one RTL in a cube and FIGS. 4C and 4D illustrate two RTL's of equal basic dimensions, AB'CD' and A'BC'D, connected in the manner of an internal RTL pair.

Figure 5B:
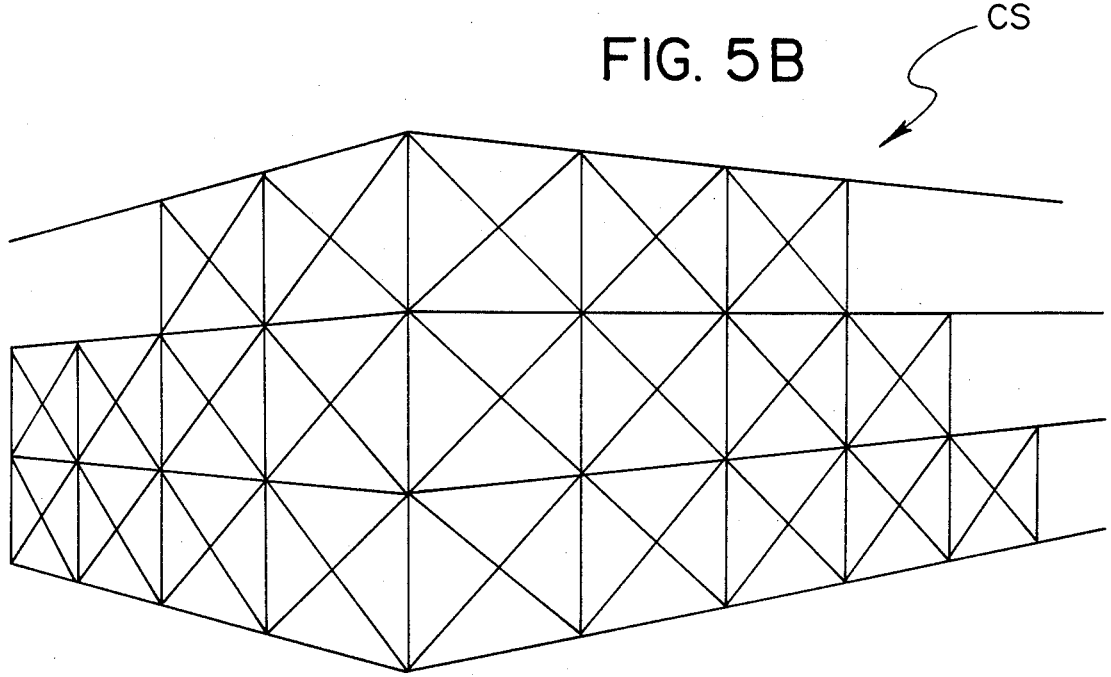

FIGS. 5A and 5B exemplify two typical internal assemblies of RTL pairs made into representative "cube structures" of this invention.

DESCRIPTION OF THE PREFERRED EMBODIMENTS

FIG. 1 shows a Regular Tetrahedral Lattice (RTL), ABCD. F is the centerpoint of element BD, G is the centerpoint of element AD, and O is the ortho-center of the RTL, the center of a sphere tangent to the RTL at all of its vertices.

FIG. 1A is the top view along the line of sight AO.

FIG. 1B is the front view along the line of sight CB. AE is the altitude of the RTL, typically constructed by producing a line from a vertex, A, through the ortho-center to intersect with, and be perpendicular to its opposite triangular face, BCD, at point E. GF is the meta-height of the RTL, shown here in normal view.

FIG. 1C is the oblique view along the line of sight FG. This view demonstrates the skew-perpendicular relationship of paired opposite elements. In this view AD and BC are shown in normal view. AB, BD, CD, and AC are shown in projection and have the apparent length of the meta-height.

FIG. 1D is a pictorial oblique view obtained by "tilting" FIG. 1C. In this view the mutual perpendicular position of GF is shown as the vertical removal of skewed pairs of elements AD and BC.

If half the length of an element of the RTL is taken as the basic unit length, the dimensions of the RTL are as follows:

$$AB, BC, CD, DB, DA, AC = 2$$

$$AF, FD = 3^{\frac{1}{2}}$$

$$AE = (8/3)^{\frac{1}{2}}$$

$$FG = 2^{\frac{1}{2}}$$

$$AG, GD, BF, FC = 1$$

$$AO, OB, OC, OD = (\tfrac{3}{2})^{\frac{1}{2}}$$

$$OF, OG = (\tfrac{1}{2})^{\frac{1}{2}}$$

All facial angles of the RTL are 60°. The angle formed at the ortho-center by limbs to any two vertices, e.g., @AOC, is known as the Normal Tetrahedral Angle, N, equal to 109°28'16". Other angles of the RTL bear the following relationship to N:

$$@ADF, @FAD = X = N/2$$

$$@AFD = Y = 180° - N$$

$$@FAO, @ODB = Z = N - 90°$$

$$@OAD, @ODA = W = 90° - N/2$$

$$X + Z = Y$$

$$Z + W = X$$

FIG. 2 shows a typical conventional truss structure. The three principle orthogonal views are shown to demonstrate its essentially planar configuration.

FIG. 3 shows two RTL's connected as in nature: face-to-face, vertex-to-vertex. In many natural crystals and in molecular compounds atoms also occupy the position of the ortho-center of these RTL's with chemico-physical bonds to atoms at the vertices. Such bonds invariable form at the angle N. It will be noted that stresses applied at non-panel points will induce bending and buckling strains in the elements since the element are laterally unsupported. It will also be noted that another RTL connected in this manner to any of the remaining six unmated faces cannot be either collinear or at right angles to the centerlines of this pair.

FIG. 4 shows two RTL's, AB'CD' and A'BC'D connected in the manner of an internal RTL pair. FIG. 4A shows the orientation of one RTL inscribed in a cube, ABCDA'B'C'D', at vertices A, B', C, and D'. This RTL is ghosted into FIG. 4C while a second RTL is inscribed at cubical vertices A',B,C', and D.

FIG. 4B is any one of the three identical principle views of the resulting edgeless virtual cubic lattice. In this view every line is the edge view of a planar, equal-armed, right-angle cross composed of one element of each of the two RTL's.

FIG. 4D is a pictorial isometric of the virtual cube to show the orientation of the six faces while, at the same time, clarifying the orientation of the RTL's and the midspan lateral support of all six elements of each at the crossing midpoints of their elements. FIG. 4D also makes clear the possibility of prefabrication of internal pairs by assembling six equal-armed, right-angle crosses.

FIG. 5A specifically exemplifies the subject matter of this patent disclosure. It depicts the assembly of three cubes along a common centerline. It will be noted in FIG. 5A that the crossed elements AB' and A'B are not duplicated in RTL's 1 and 2 nor are elements DC' and D'C in RTL's 2 and 3, but are shared as a common cubic interface in the structure of each of their respective RTL pairs.

Sizing of the elements can well be made to allow for disproportionate stresses encountered. Elements having different cross sectional shapes and/or material is contemplated. Moreover, macrostructures of this type can conveniently be made by connecting only the four remaining crosses of RTL 2 between the aforementioned crosses of RTL's 1 and 3.

FIG. 5B shows this method of connection applied at each of the six faces of the imaginary cube. The CS assembly, produced as it is, in both senses of the three orthogonal dimensions effectively occupies a total space.

Although the present invention has been described in conjunction with certain preferred embodiments, it will be understood by those skilled in the art that many modifications and variations may be employed without departing from the spirit and scope of this disclosure. Such modifications and variations should be considered as being within the purview and scope of this invention and the appended claims.

Thus, having disclosed my invention, I claim:

1. A lattice structure consisting of at least 3 imaginary, edgeless cubic cells, wherein each cell contains a regular tetrahedral lattice pair and each regular tetrahedral lattice pair is formed exclusively from six equal-armed, right-angle crossing elements of equal length joined at eight vertices, each vertex corresponding to a corner of one of said cubic cells with each of said cubic cells, together with each of said regular tetrahedral lattice pairs, sharing an interface with at least one other cubic cell and regular tetrahedral lattice pair of said lattice structure.

2. The structure of claim 1 which further comprises at least one element having a different cross-sectional configuration from the other elements which makes up a regular tetrahedral lattice pair.

3. The structure of claim 1 which further comprises at least one element of different material from the other elements which make up a regular tetrahedral lattice pair.

* * * * *